Dec. 18, 1934.     A. GRECO     1,985,206

SYSTEM OF ELECTRICAL DISTRIBUTION

Filed Oct. 4, 1930

Inventor
Alfredo Greco
By *Attorney*

Patented Dec. 18, 1934

1,985,206

UNITED STATES PATENT OFFICE 1,985,206

SYSTEM OF ELECTRICAL DISTRIBUTION

Alfredo Greco, Zurich, Switzerland, assignor to Aktiengesellschaft Brown Boveri & Cie., Baden, Switzerland, a joint-stock company of Switzerland Application October 4, 1930, Serial No. 486,333
In Germany October 9, 1929

4 Claims. (Cl. 171—97)

This invention relates to electric systems employing rectifiers such as mercury arc rectifiers, as a source of current supply to a transmission line having devices connected thereto operative to cause flow of current in the transmission line of such direction as to oppose the flow of current from the rectifier or rectifiers in such line.

The invention has particular application to electric systems supplied with operating current from rectifiers for the operation of electric railway cars and trains employing electric regenerative braking.

Because the valve action of electric rectifiers operates to prevent reverse flow of current therethrough, it has heretofore been found difficult, if not impossible, to employ electric regenerative braking in the operation of electric railway cars and trains supplied with operating current from rectifiers. In order, therefore, that this desirable form of braking may be employed in the operation of electric railway cars and trains the present invention envisages the connection of means at a rectifier current supply station with a current supply line which shall be operative to provide a circuit for reverse flow of energy at times of regenerative braking of an electric car or train.

A characteristic feature of the invention is, therefore, the provision of loading resistances so disposed in association with means operative to effect the automatic connection thereof in circuit with the current supply line upon the occurrence of reverse flow of current therein such as resulting, for example, from the regenerative braking of electric cars or trains.

Figure 1:
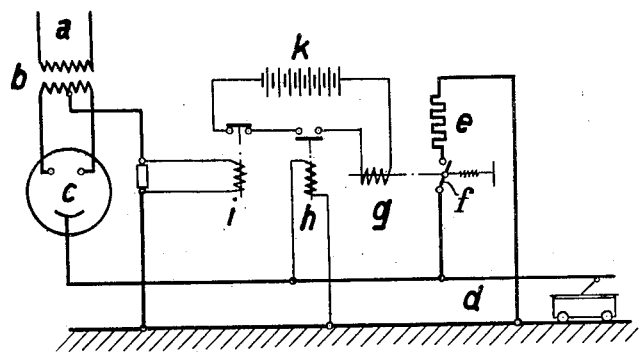
Figure 2:
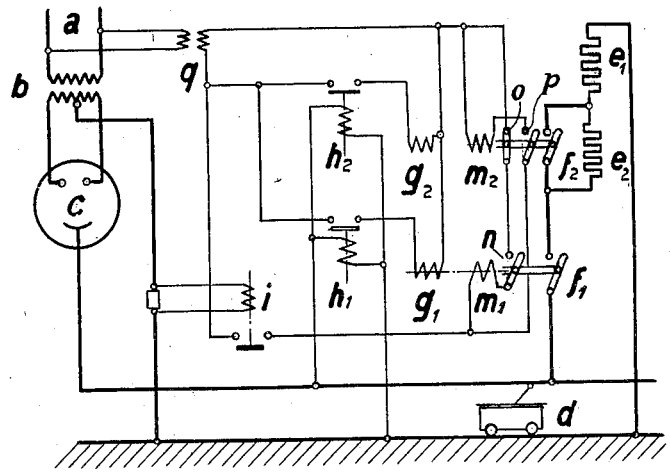
Figure 3:
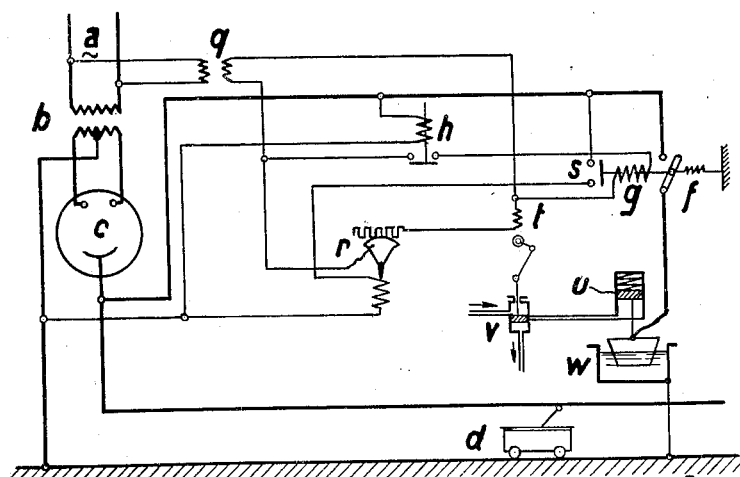

For a full understanding of the invention and the manner of its operation, reference is to be had to the following description taken in connection with the accompanying drawing, in which:

Figure 1 illustrates, in diagrammatic form, one embodiment of the invention wherein there is shown means operative to cause the automatic connection of a metallic or other solid resistance with the current supply line;

Fig. 2 illustrates an embodiment of the invention similar to the embodiment illustrated in Figure 1, but differing therefrom in that means are shown for automatically regulating the amount of resistance connected with the current supply line; and Fig. 3 illustrates a further embodiment of the invention which differs substantially from the embodiment of Figs. 1 and 2, by the provision of a liquid resistor together with means for causing the automatic connection thereof in circuit with the current supply line and the control thereof in dependence upon the potential of the line.

Referring to the drawing by characters of reference, $a$ represents the alternating current supply to the rectifier, $b$, the rectifier transformer, $c$ the rectifier and $d$ the direct current traction system supplied with operating current from the rectifier. Arranged to be connected in parallel with the embodiment of the load on the direct current system is the loading resistor $e$ which in accordance with Fig. 1 consists only of one unit. The connection of resistor $e$ in circuit with the direct current system is effected through closure of switch $f$, the coil of the electric closing mechanism of which is supplied with current from a battery $k$ over the contacts of relays $h$ and $i$. The relay $h$ is excited by the rectifier or direct current system voltage and the relay $i$ is excited by the rectifier current.

The operation of the embodiment of the invention according to Figure 1 of the drawing may be described as follows. If the voltage of the traction system $d$ rises above the no-load voltage of the rectifier $c$, due to the regenerative action of the vehicles, the direction of the current will not reverse and flow through the rectifiers, because the valve action of the latter does not permit of this. Therefore, as soon as the no-load voltage of the rectifier is exceeded, the relay $h$ will respond completing the circuit of the closing coil $g$ and cause the switch $f$ to be closed. The traction system then operates on the loading resistor $e$. When the voltage of the traction system drops to the no-load voltage, the rectifier commences to operate, in parallel with the system, on the loading resistor $e$. This condition continues until the current of the rectifier rises to a certain value and causes the series relay $i$ to respond, opening the circuit of the closing coil $g$ and thus allowing the switch $f$ to open.

The arrangement in Fig. 2 shows the loading resistor in two units, the first of these being designated $e_1$ and the second $e_2$. The total resistance may be connected into circuit by means of the switch $f_1$ while one resistor unit $e_2$ may be short circuited by the switch $f_2$. In this instance the switches besides being provided with the closing coils $g_1$ $g_2$ have special tripping coils $m_1$ $m_2$ which receive current over the interlocking contacts $n$, $o$, $p$ on the switches $f_1$ and $f_2$ and over the relay $i$ shown here with contacts which close upon energization thereof. The auxiliary source of current shown is the alternating current voltage transformed by the voltage transformer $q$.

The sequence of operations with the arrangement according to the embodiment of Fig. 2 is as follows. When the voltage of the traction system exceeds the no-load voltage of the rectifier $c$, the relay $h_1$ immediately responds and establishes the energizing circuit for the closing coil $g_1$ which closes the switch $f_1$ and connects the total resistance $(e_1+e_2)$ across the traction system $d$. Should the regenerative energy delivered from the system be greater than resistors $(e+e_2)$ can absorb, the voltage will rise still further causing relay $h_2$ to respond and establish the energizing circuit for closing coil $g_2$ causing switch $f_2$ to close and short circuit the section $e_2$ of the resistor. The resistance of the resistor, being reduced, a larger amount of energy will be absorbed. The loading resistor will similarly be cut out in steps. When the current from the rectifier to the resistor exceeds a definite value, the relay $i$ responds but in doing so closes only the circuit to the tripping coil $m_2$ of the switch $f_2$ since although the auxiliary contact $p$ is closed, the contact $o$, in circuit with the coil $m_1$, is open. The opening of the switch $f_2$ causes the current delivered by the rectifier to drop and therefore the relay $i$ reopens. It will only close again when the current reaches the tripping value of this relay and in this instance, the contact $o$ being closed, the tripping coil $m_1$ of the switch $f_1$ will be excited and the whole resistor thus cut out of circuit.

Should the regenerated output of the traction system vary within still greater limits, loading resistors in more than two units may be utilized.

An infinitely variable regulation of the loading is achieved by means of the water resistor according to Fig. 3. Due to the rise in voltage caused by regeneration, the relay $h$ responds and closes the switch $f$ by means of the closing coil $g$. The water resistor $w$ is then in parallel with the traction system and can be regulated for example by the hydraulic servomotor $u$. The auxiliary contact $s$ is closed with the closing of the switch $f$ and causes the exciting coil of the automatic quick acting regulator $r$ to be connected with the voltage of the rectifier $c$. The regulator $r$ operates a torque magnet $t$ which in turn adjusts the pilot valve $v$ of the servomotor $u$. In this manner due to the constant alteration of the loading resistance while the vehicles are braking, the voltage at the rectifier is kept at an approximately constant value until finally no further regulation occurs, the end position being reached when the regeneration is nil. The voltage then drops allowing the relay $h$ to fall so that the switch $f$ opens.

The servomotor does not necessarily require to be of the hydraulic type: an electric motor may be used which is controlled by contact relays.

The invention may be developed along various lines but the examples given suffice to illustrate its object.

I claim:

1. In an electrical braking system, the combination with a transmission line, an electric current rectifier connected with and operable to supply current therethrough to said line in one direction and being operable to prevent flow of current therethrough in another direction, and a dynamo electric machine connectible with said line to receive current from said rectifier to operate as a motor and to be driven as a regenerative braking generator to return current to said line in said another direction, of means connectible with said line to form a dynamic braking circuit for said machine, means operable responsive to voltage above the no load voltage of said rectifier impressed on said line by said machine when operating as a regenerative braking generator for causing connection of the first said means with said line, and means operable responsive to and in dependence upon the flow of current in said line from said rectifier for permitting and for preventing operative connection of the first said means with said line.

2. In an electric braking system, the combination with a transmission line, an electric current rectifier connected with and operable to supply current therethrough to said line in one direction and being operable to prevent flow of current therethrough in another direction while connected to said line, and a dynamo electric machine connectible with said line to receive current from said rectifier to operate as a motor and to be driven as a regenerative braking generator to return current to said line in said another direction, of a resistor divided into a plurality of serially connected portions connectible with said line to form a dynamic braking circuit for said machine, means selectively operable responsive to voltages above the no load voltage of said rectifier impressed on said line by said machine when operating as a regenerative braking generator for causing operative connection of portions of said resistor with said line in dependence upon the magnitude of said voltages impressed on said line by said machine whereby the flow of current in said line from said machine during dynamic braking operation may be regulated in dependence upon the voltage thereof, and means operable responsive to and in dependence upon the flow of current in said line from said rectifier for controlling the operative connection and disconnection of said resistor with said line.

3. In an electric braking system, the combination with a transmission line, an electric current rectifier connected with said line operable to supply current therethrough to said line in one direction and being operable to prevent flow therethrough in another direction while connected to said line, and a dynamo electric machine connectible with said line to receive current from said rectifier to operate as a motor and to be driven as a regenerative braking generator to return current to said line in another direction, of a resistor divided into a plurality of sections connectible with said line to form a dynamic braking circuit for said machine, a plurality of switches selectively operable to operatively connect and disconnect the whole or a section only of said resistor with said line, relays connected with said line operable to cause said connecting operations of said switches, the said relays being selectively operative responsive to and in dependence upon the magnitude of voltages above the no load voltage of said rectifier impressed on said line by said machine when operating as a regenerative braking generator, and relay means operable responsive to flow of current in said line from said rectifier for causing said disconnect operations of said switches.

4. In an electrical braking system, the combination with a transmission line, an electric current rectifier connected with and operable to supply current therethrough to said line in one direction and being operable to prevent flow of current therethrough in another direction while connected to said line, a dynamo electric machine connectible with said line to receive current from said rectifier to operate as a motor and to be driven as a regenerative braking generator to return current to said line in said another direction, of a variable resistance connectible with said line to form a dynamic braking circuit for said machine, a relay operable to cause connection of said resistance with said line, means for varying the effective amount of said resistance, the said relay and resistance-varying means being operable responsive to and in dependence upon voltages above the no load voltage of said rectifier impressed on said line by said machine when operating as a regenerative braking generator whereby the dynamic braking action of said machine is controlled in dependence upon the magnitude of voltage impressed thereby on said line, and means operable responsive to and in dependence upon the flow of current in said line from said rectifier for permitting and for preventing operation of said resistance-varying means.

ALFREDO GRECO.